(12) United States Patent
Jurkat

(10) Patent No.: US 7,805,222 B2
(45) Date of Patent: Sep. 28, 2010

(54) METHOD FOR THE DETERMINATION OF A CONTROL RESERVE AND WIND ENERGY PLANT WITH A CONTROL UNIT FOR THE DETERMINATION OF THE CONTROL RESERVE

(75) Inventor: Mark Jurkat, Norderstedt (DE)

(73) Assignee: Nordex Energy GmbH, Norderstedt (DE)

( * ) Notice: Subject to any disclaimer, the term of this patent is extended or adjusted under 35 U.S.C. 154(b) by 430 days.

(21) Appl. No.: 11/934,363

(22) Filed: Nov. 2, 2007

(65) Prior Publication Data

US 2009/0033096 A1 Feb. 5, 2009

(30) Foreign Application Priority Data

Aug. 2, 2007 (DE) .................. 10 2007 036 446

(51) Int. Cl.
*H02P 9/00* (2006.01)
(52) U.S. Cl. .......................... 700/287; 290/44; 290/55; 322/35
(58) Field of Classification Search ................. 700/287; 290/44, 55; 322/35
See application file for complete search history.

(56) References Cited

U.S. PATENT DOCUMENTS

2006/0142899 A1* 6/2006 Wobben ..................... 700/286
2007/0085343 A1* 4/2007 Fortmann .................... 290/44
2009/0055030 A1* 2/2009 Mayor et al. ................ 700/287

FOREIGN PATENT DOCUMENTS

DE   699 19 910   9/2005
GB   1319978      6/1973

* cited by examiner

*Primary Examiner*—Ryan A Jarrett
(74) *Attorney, Agent, or Firm*—Vidas, Arrett & Steinkraus, P.A.

(57) ABSTRACT

A method for the determination of a control reserve of one or plural wind energy plants, for the operation of which a desired value for at least one electric variable is preset, and for which a control unit is provided which has a power curve, which contains a maximum value of the electric variable depending on values of the wind, the method having the following steps: the control unit determines a maximum value of the electric variable from the actual value of the wind and subtracts a current value of the electric variable from the same, the control unit transmits the determined maximum value and/or the difference as a control reserve to a higher order control unit and/or an external utility.

27 Claims, 3 Drawing Sheets

METHOD FOR THE DETERMINATION OF A CONTROL RESERVE AND WIND ENERGY PLANT WITH A CONTROL UNIT FOR THE DETERMINATION OF THE CONTROL RESERVE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for determining a control reserve of one or plural wind energy plants, for the operation of which a desired value is preset for at least one electric variable.

With increasing capacity of wind energy plants and the combination thereof to wind parks, there is a demand to be able to regulate or control, respectively, the feeding of electric power into the electric grid. Already to-day it is known to operate wind energy plants and wind parks with a throttled power, when no higher power can be fed into the grid.

The present invention is based on the objective to provide a method and a wind energy plant which offer the possibility to currently estimate the existing power reserve of an electric variable in a throttled operation with simple means.

BRIEF SUMMARY OF THE INVENTION

In the method of the present invention, a control reserve of one or plural wind energy plants is determined. In the operation of the wind energy plants, there is a control reserve when a desired value for at least one electric variable is provided for the operation of the wind energy plant which is smaller than the maximum available value. The control unit which determines the control reserve has a power curve, in which at least one maximum value of the electric variable depending on values of the wind is laid down. The power curve may completely or partially contain measured values, but it is also possible to work with a theoretical characteristic curve, which includes initially preset values. In the method of the present invention, the control unit determines from the actual value of the wind the maximum value of the electric variable which could currently be supplied. With the maximum value, it is dealt with a value averaged across a time interval, which can also be exceeded or fallen below for a short time in the operation. A current value of the electric variable is subtracted from this maximum value. The difference determined by the control unit is transmitted to a higher order control unit and/or to an external utility as the control reserve. Alternatively, even the maximum value can be transmitted to the higher order control unit and/or to an external utility. Thus, in the method of the present invention, the actual value of the control reserve is determined through the current value of an electric variable and the measured wind via the power curve. The current value of the electric variable can be a matter of the actual value or of the desired value of the electric variable.

As the control reserve, the positive difference is preferably regarded, at which the wind energy plant or the wind energy plants, respectively, could produce higher values of the electric variable than is currently permitted due to the desired value presetting.

In the method of the present invention, the generated active power may be provided as the electric variable. In this context, the control reserve is sometimes also designated as lead active power. Alternatively or in addition, the generated reactive power can be applied to as the electric variable. Also, the phase angle and/or the power factor can be applied to as the electric variable. Thus, the concept of a power curve is not only related to an electric power to be provided, but commonly to an electric variable, and it indicates for the same which maximum value can be afforded.

In a preferred embodiment, the desired value of the electric variable will be preset by a higher order control unit. Preferably, an operation control of the wind energy plant or a control unit for several wind energy plants determines the desired values for the individual wind energy plants based on the preset desired value, which are then implemented in a corresponding manner.

In a preferred embodiment, the wind velocity is applied as the relevant value of the wind. This means that the maximum value of the electric variable which can be generated is laid down in the power curve for the corresponding wind velocity.

In individual examples of realisation, it may be provided that the wind velocity is measured on a weather mast, wherein the weather mast is practically put on the ground in a position relative to the wind energy plant or the wind energy plants which is favourable for measuring the wind velocity.

Alternatively or in addition, it is also possible that the wind velocity is measured at one or several ones of the wind energy plants.

The objective of the present invention is also resolved by a wind energy plant with a control unit and an operation control. The control unit determines a control reserve for an electric variable. The operation control is provided for the purpose to preset the desired value for at least one electric variable of the power to be fed during the operation of the wind energy plant. Further, an actual value for the electric variable and for the wind is applied to the control unit. The control unit of the present invention is characterised in that it has a power curve, which indicates a maximum value of the electric variable depending on a value of the wind. The control unit determines the difference between the current maximum value and a current value of the electric variable. This difference constitutes the control reserve. With the control unit and the power curve, the wind energy plant of the present invention can indicate at every point of time during a throttled operation how great the currently retrievable reserve is. The current value of the electric variable is preferably the actual value or the desired value of the electric variable.

In a preferred embodiment, the wind energy plant is equipped with means for measuring the actual value of the electric variable.

Preferably, the electric variable of the power curve is the generated active power of the wind energy plant. Alternatively, the generated reactive power of the wind energy plant can be provided as the electric variable of the power curve. It is also possible to apply the phase angle and/or the power factor as the electric variable in the power curve.

In a preferred embodiment, the operation control of the wind energy plant receives the desired value for the electric variable from a higher order control unit.

It has proven to be practical to lay down the maximum value of the electric variable, depending on the wind velocity, in the power curve. However, it is also conceivable to take into account in addition other variables as values for the wind, like wind direction, air pressure, air humidity and so on, for instance.

The method of the present invention can be particularly preferably applied to a wind park with a plurality of wind energy plants. In this, the control reserve of the wind energy plants is determined according to the method of the present invention. In doing so, one control unit has plural power curves for individual wind energy plants and/or groups of wind energy plants. In the wind park, the power to be recorded or being generated, respectively, can be measured centrally in the wind park and/or locally, in order to determine the control reserve. Also, plural control units can be provided, which forward the determined control reserves to a higher order control unit.

BRIEF DESCRIPTION OF SEVERAL VIEWS OF THE DRAWINGS

In the following, the present invention is explained in more detail by means of an example.

DETAILED DESCRIPTION OF THE INVENTION

Figure 1:
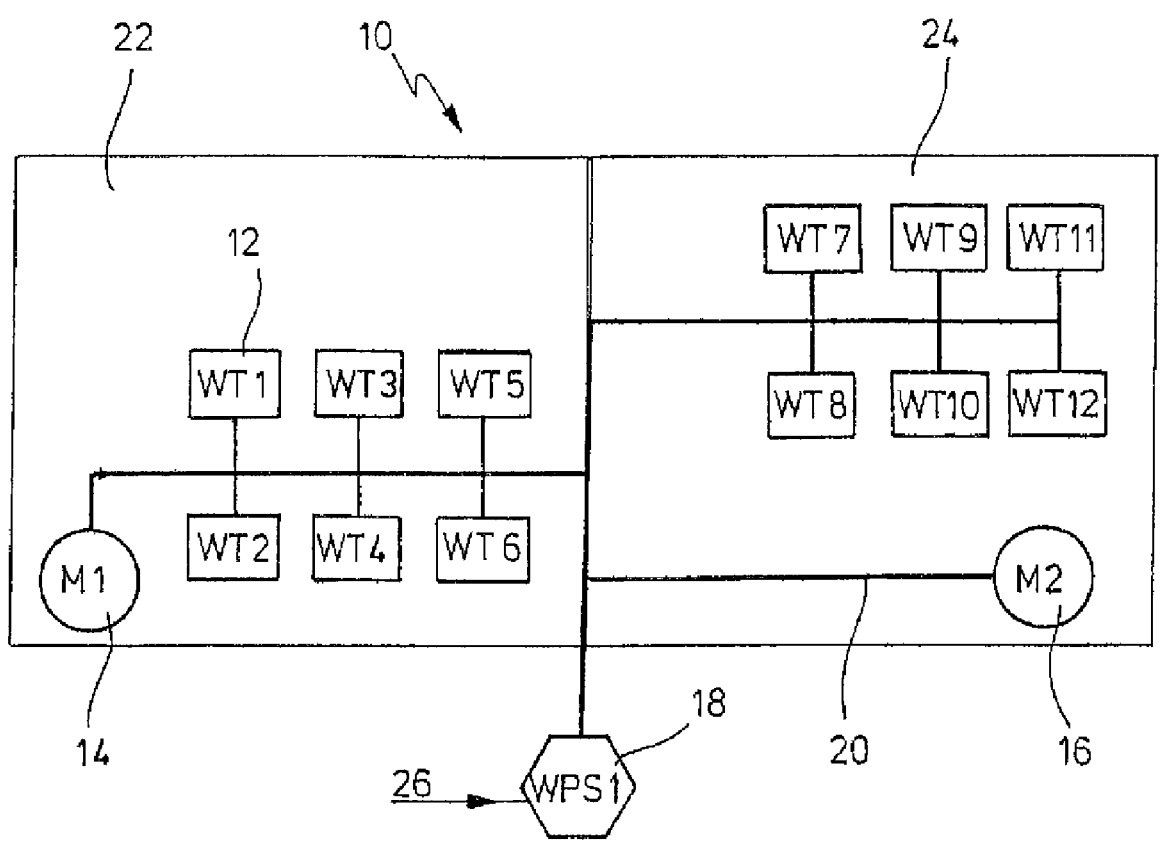
FIG. 1 shows a wind park with two segments.

While this invention may be embodied in many different forms, there are described in detail herein a specific preferred embodiment of the invention. This description is an exemplification of the principles of the invention and is not intended to limit the invention to the particular embodiment illustrated FIG. 1 shows in a schematic view a wind park 10 with twelve wind energy plants 12, which are designated as WT1 to WT12. Further, two weather masts 14 and 16 are erected in the wind park. The position of the weather masts 14 and 16 shown in FIG. 1 does not necessarily reflect the relative position of the weather masts to the wind energy plants 12. Via a communication net 20, the wind energy plants 12 and the weather masts 14, 16 are connected to a central wind park control 18. Via the data net 20, data and signals from the wind energy plants 12 and the weather masts 14 and 16 can be bidirectionally exchanged with the central wind park control 18.

In the example depicted in FIG. 1, the wind energy plants 12 are subdivided into two segments, wherein the wind energy plants WT 1 to WT6 are assigned to the first segment 22, and the wind energy plants WT 7 to WT12 to the second segment 24. From the weather masts, the weather mast 14 designated with M1 is assigned to the first segment 22, while the weather mast 16 designated with M2 is assigned to the second segment 24.

In the described example of realisation, an externally preset desired value 26 for the maximum active power to be fed is applied to the central wind park control 18. From the applied desired value 26, the central wind park control 18 determines desired values for the active power for the first segment 22 and the second segment 24, respectively. In a subsequent step, which can be also performed by the central wind park control 18 or can be distributed to plural controls, desired values for the wind energy plants WT1 to WT6 and WT7 to WT12, respectively, are determined from the desired value for the active power preset for the segment 22, 24.

Figure 2:
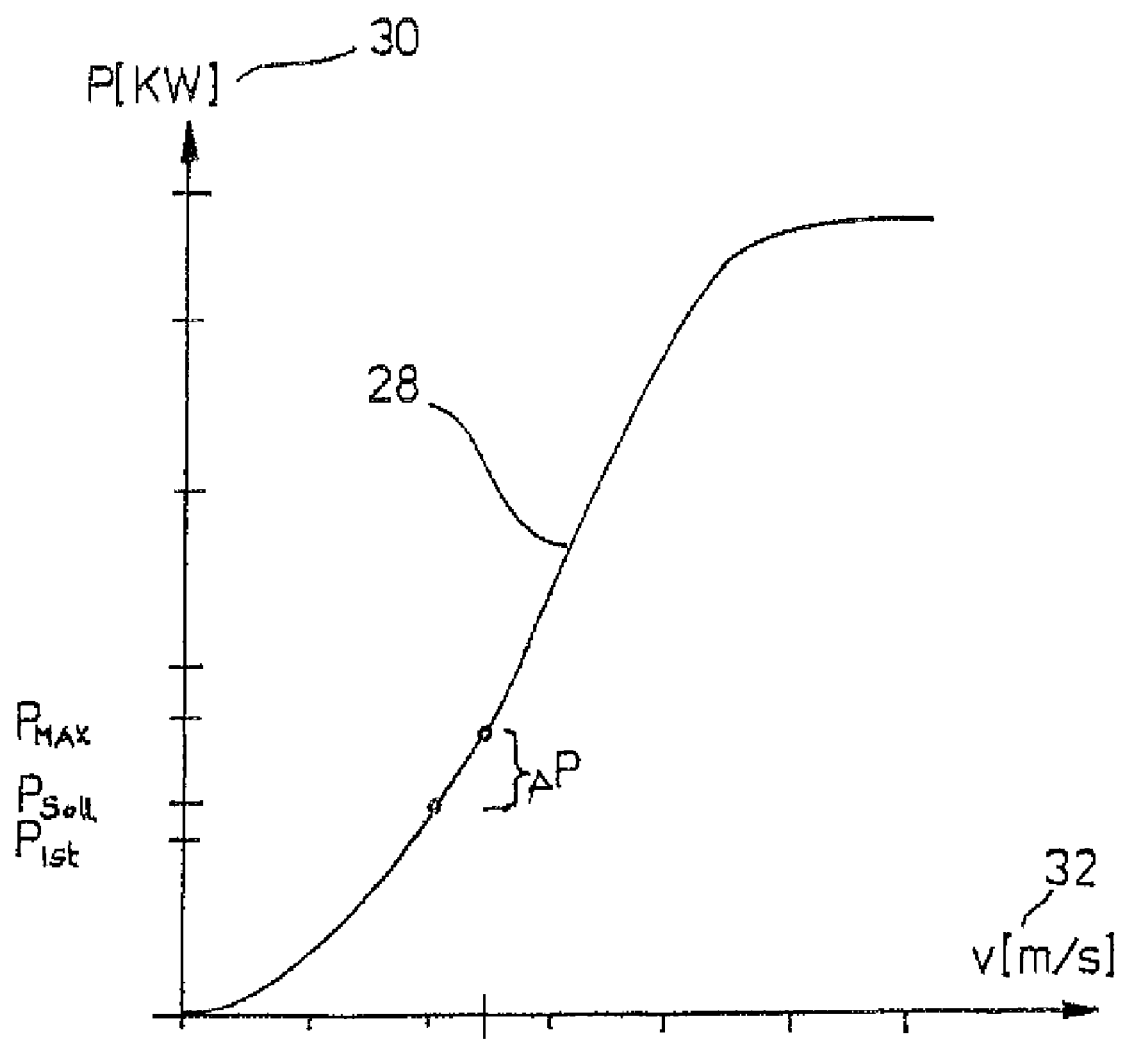
FIG. 2 shows a power curve, in which the active power is plotted against the wind velocity.

Independently from the distribution of the generated active power in the first and second segment, a power curve for the entire segment is deposited in the central wind park control 18. The power curve is depicted as an example in FIG. 2. In the depicted power curve 28, the active power 30 of the wind energy plants of a segment is plotted against the wind velocity 32. In the depicted plot against the absolute wind velocity, it is also conceivable to take into account other influencing factors of the wind. For instance, different power curves depending from the wind direction can be deposited. It is also possible to deposit a power curve for the plant in each one of the wind energy plants, and to determine its maximum value for each plant in this way.

In the determination of the power reserve, the wind park control determines the current value for the wind v1 and establishes the maximum power value $P_{max}$ from it via the power curve 28. At the same time, the central wind park control 18 has a determined desired value for the active power generated in the observed segment at hand. As an example, the desired value is drawn in the FIG. 2 as $P_{soll}$. As already mentioned, there is a positive power reserve of the wind park or the segment of the wind park, respectively, when the desired value is smaller than the available maximum value. Regarding now the case that the operation state of the wind energy plant is adjusted, the actual value of the generated power corresponds to the preset desired value. In order to take into account possible delays in the adjustment of the power values, the actual value $P_{ist}$ is applied for the determination of the power reserve. The difference $\Delta P$ between the maximum power value $P_{max}$ and the actual value of the power $P_{ist}$ is drawn in FIG. 2 as $\Delta P$. $\Delta P$ is that power amount which can be provided at constant wind velocity for a short time as a power reserve.

Figure 3:
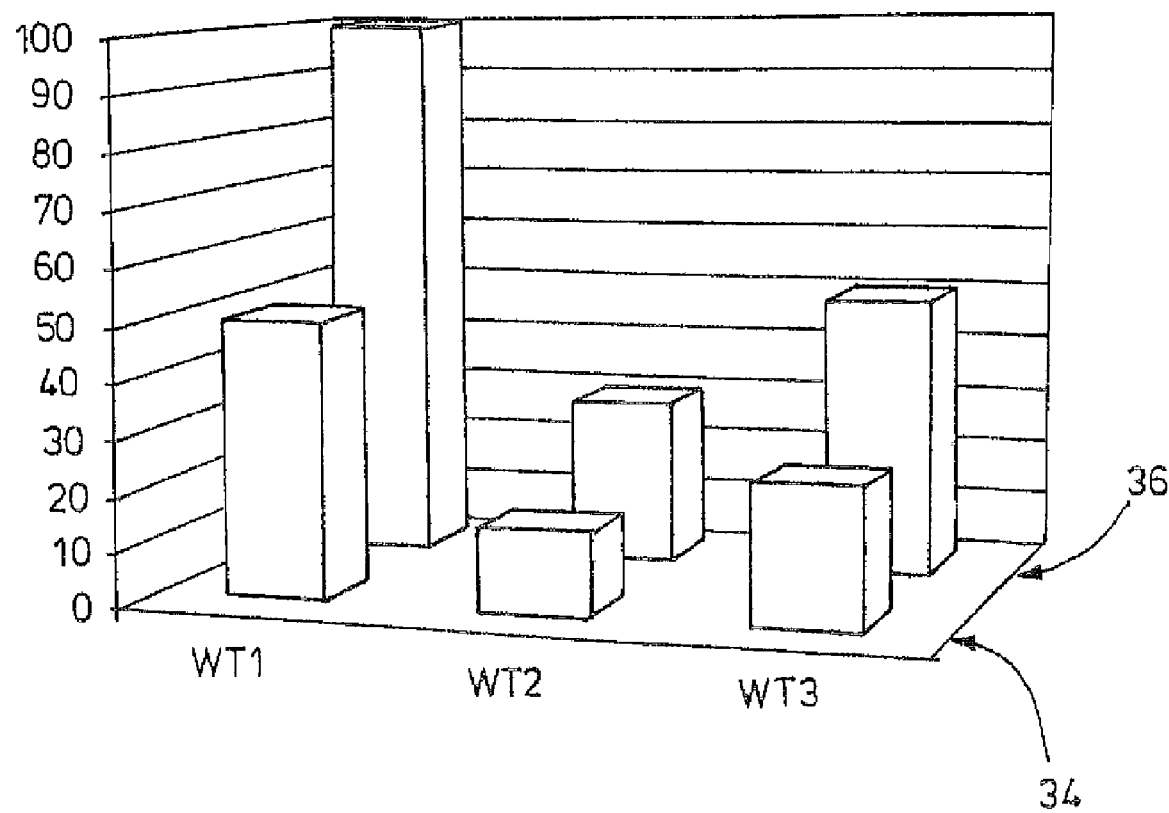
FIG. 3 shows a column diagram for the control reserve in a wind park.

FIG. 3 observes the case that different desired values for the active power are preset to individual wind energy plants. For instance, in FIG. 3 a desired value for power is preset to the wind energy plant WT1, which is approximately 4 to 5 times as great as the desired value for power for the wind energy plant WT2. The actual power values of the wind energy plants are depicted as front columns 34 in FIG. 3. As rear columns 36, the maximum available powers of the individual wind energy plants are depicted in FIG. 3. In FIG. 3 it can be clearly recognised that the actual power values 34 are each at a time smaller than the available maximum power of the wind energy plants WT1-WT3. The control reserve in the example shown in FIG. 3 results altogether from the sum of the control reserves present on the individual wind energy plants. The time needed for providing the control reserve is determined in this by the time which is needed by the wind energy plant which is the slowest with respect to the control procedure for accessing its control reserve.

The above disclosure is intended to be illustrative and not exhaustive. This description will suggest many variations and alter natives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g., each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the determination of a control reserve of one or plural wind energy plants, for the operation of which a desired value for at least one electric variable is preset, and for which a control unit is provided which has a power curve, which contains a maximum value of the electric variable depending on values of the wind, the method having the following steps: the control unit determines a maximum value of the electric variable from the actual value of the wind and subtracts a current value of the electric variable from the maximum value of the electric variable, and the control unit transmits the determined maximum value to a higher order control unit.

2. A method according to claim 1, characterized in that the current value of the electric variable is the actual value of the electric variable.

3. A method according to claim 1, characterized in that the current value of the electric variable is the desired value of the electric variable.

4. A method according to claim 1, characterized in that a generated active power is provided as the electric variable.

5. A method according to claim 1, characterized in that a generated reactive power is provided as the electric variable.

6. A method according to claim 1, characterized in that a phase angle is provided as the electric variable.

7. A method according to claim 1, characterized in that the desired value of the electric variable is preset by a higher order control unit.

8. A method according to claim 1, characterized in that the wind velocity is measured as the value of the wind.

9. A method according to claim 8, characterized in that the wind velocity is measured on a weather mast (14, 16).

10. A method according to claim 8, characterized in that the wind velocity is measured at one or plural ones of the wind energy plants.

11. A wind park with a plurality of wind energy plants, the control reserves of each of which are determined with the method according to the claim 1, characterized in that a control unit (18) with plural power curves for the plurality of wind energy plants is provided.

12. A wind park according to claim 11, characterized in that the power to be recorded is centrally measured in the wind park.

13. A wind park according to claim 11, characterized in that at least one wind energy plant measures its power which is to be recorded.

14. A wind park according to claim 11, characterized in that plural control units are provided, for which a control unit is given priority on which the control reserves of the control unit (18) are applied.

15. The method according to claim 1, the control unit transmits the determined maximum value to an external utility.

16. The method according to claim 1, the control unit transmits the determined difference as the control reserve to a higher order control unit.

17. The method according to claim 1, the control unit transmits the determined difference as the control reserve to an external utility.

18. A method according to claim 1, characterized in that a power factor is provided as the electric variable.

19. A wind energy plant with a control unit, the control unit determining a control reserve for an electric variable, and with an operation control, which presets the desired value for at least one electric variable for the operation of the wind energy plant, wherein a current value for the electric variable and for the wind is applied to the control unit, characterised in that the control unit has a power curve, which indicates a maximum value of the electric variable depending from the value of the wind and which determines the difference between the maximum value and a current value of the electric variable as the control reserve.

20. A wind energy plant according to claim 19, characterized in that the current value of the electric variable is the actual value of the electric variable.

21. A wind energy plant according to claim 19, characterized in that the current value of the electric variable is the desired value of the electric variable.

22. A wind energy plant according to claim 19, characterized in that the wind energy plant is equipped with means for measuring the actual value of the electric variable.

23. A wind energy plant according to claim 19, characterized in that the electric variable of the power curve is the active power of the wind energy plant.

24. A wind energy plant according to claim 19, characterized in that the electric variable of the power curve is the reactive power of the wind energy plant.

25. A wind energy plant according to claim 19, characterized in that the electric variable of the power curve is the phase angle of the wind energy plant.

26. A wind energy plant according to claim 19, characterized in that the operation control receives the desired value for the electric variable from a higher order control unit.

27. A wind energy plant according to claim 19, characterized in that the maximum value of the electric variable, depending on the wind velocity, is laid down in the power curve.

* * * * *